(12) United States Patent
Kondo et al.

(10) Patent No.: US 8,203,669 B2
(45) Date of Patent: Jun. 19, 2012

(54) LIQUID CRYSTAL DISPLAY DEVICE

(75) Inventors: Hisao Kondo, Kirishima (JP); Katsumi Tsuchida, Kirishima (JP); Hisashi Narita, Higashihiroshima (JP); Shigenori Oota, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/435,003

(22) Filed: May 4, 2009

(65) Prior Publication Data

US 2009/0207338 A1 Aug. 20, 2009

Related U.S. Application Data

(63) Continuation of application No. 11/459,882, filed on Jul. 25, 2006, now Pat. No. 7,545,461.

(51) Int. Cl.
*G02F 1/1335* (2006.01)
*G02F 1/1333* (2006.01)

(52) U.S. Cl. .......................... 349/69; 349/161

(58) Field of Classification Search .................... 349/69, 349/161
See application file for complete search history.

(56) References Cited

U.S. PATENT DOCUMENTS

| | | | |
|---|---|---|---|
| 5,057,909 A | 10/1991 | Mok et al. | |
| 5,169,805 A | 12/1992 | Mok et al. | |
| 5,499,120 A | 3/1996 | Hansen | |
| 5,500,785 A | 3/1996 | Funada | |
| 5,586,007 A | 12/1996 | Funada | |
| 5,958,562 A | 9/1999 | Tsuji et al. | |
| 6,574,030 B1 | 6/2003 | Mosier | 359/267 |
| 2004/0004424 A1 | 1/2004 | Sakurai | |
| 2005/0024834 A1* | 2/2005 | Newby | 361/719 |
| 2005/0068776 A1 | 3/2005 | Ge | |
| 2005/0122031 A1* | 6/2005 | Itai et al. | 313/498 |
| 2005/0161780 A1* | 7/2005 | Wang et al. | 257/678 |
| 2006/0023448 A1* | 2/2006 | Mok et al. | 362/231 |
| 2006/0132699 A1* | 6/2006 | Cho et al. | 349/161 |
| 2006/0198147 A1 | 9/2006 | Ge | |

FOREIGN PATENT DOCUMENTS

| | | |
|---|---|---|
| CN | 1417868 A | 5/2003 |
| CN | 2585273 | 11/2003 |
| JP | 61046761 A | 3/1986 |
| JP | 02202073 A | 8/1990 |
| JP | 03235357 A | 10/1991 |
| JP | 04137654 A | 5/1992 |
| JP | 06252285 A | 9/1994 |
| JP | 07254762 A | 10/1995 |
| JP | 09107162 A | 4/1997 |
| JP | 2000216437 A | 8/2000 |

(Continued)

OTHER PUBLICATIONS

Kondo—Machine Translation of JP2006154136—Jun. 2006.*

(Continued)

*Primary Examiner* — Phu Vu
(74) *Attorney, Agent, or Firm* — DLA Piper LLP (US)

(57) ABSTRACT

A liquid crystal display device comprising a liquid crystal display panel, a backlight and a heat sink member is disclosed. The backlight comprises a light-guiding plate disposed on one principal surface side of the liquid crystal display panel, LED light sources disposed on an end surface of the light-guiding plate, a mounting board for mounting the LED light sources thereon and a thermally conductive member connected to the mounting board. The heat sink member is connected to the mounting board through the thermally conductive member.

17 Claims, 12 Drawing Sheets

FOREIGN PATENT DOCUMENTS

| | | | |
|---|---|---|---|
| JP | 2001014922 A | | 1/2001 |
| JP | 2001110960 A | | 4/2001 |
| JP | 2001160312 A | | 6/2001 |
| JP | 2001343007 A | | 12/2001 |
| JP | 2002162626 A | | 6/2002 |
| JP | 2002229022 A | | 8/2002 |
| JP | 2003036717 A | | 2/2003 |
| JP | 2003281924 A | | 10/2003 |
| JP | 2003282951 A | | 10/2003 |
| JP | 2003282956 A | | 10/2003 |
| JP | 2003313440 A | | 11/2003 |
| JP | 2004004397 A | | 1/2004 |
| JP | 2006-011239 | | 1/2006 |
| JP | 2006-011242 | | 1/2006 |
| JP | 2006-023654 | | 1/2006 |
| JP | 2006011239 | * | 1/2006 |
| JP | 2006039341 | * | 1/2006 |
| JP | 2006-039341 | | 2/2006 |
| JP | 2006-039349 | | 2/2006 |
| JP | 2006-064733 | | 3/2006 |
| JP | 2006-098500 | | 4/2006 |
| JP | 2006-154136 | | 6/2006 |
| JP | 2006154136 | * | 6/2006 |
| TW | 572219 U | | 1/2004 |
| TW | 200403497 A | | 3/2004 |

OTHER PUBLICATIONS

Narita—Machine Translation of JP2006011239—Jan. 2006.*

Tsuchida—Machine Translation of JP200603941—Jan. 2006.*

Japanese language office action and its English language translation for corresponding Japanese application 2004191222.

Japanese language office action and its English language translation for corresponding Japanese application 2004191226.

Japanese language office action and its English language translation for corresponding Japanese application 2004221289.

Japanese language office action and its English language translation for corresponding Japanese application 2004221387.

Korean language office action dated Jul. 28, 2011 and its partial English language translation for corresponding Korean application 1020050056724.

Chinese language office action dated Aug. 4, 2010 and its English language translation for corresponding Chinese application 200810174602.3.

Japanese language office action dated Aug. 31, 2010 and its English language translation for corresponding Japanese application 2004221289.

Taiwanese language office action dated Nov. 23, 2011 and its partial English translation for corresponding Taiwanese application 094121818.

Japanese language office action dated Aug. 31, 2010 and its English language translation for corresponding Japanese application 2004221387.

Partial English translation of Korean office action dated Mar. 5, 2012 issued in corresponding Korean application 1020110125139 cites the foreign patent documents above.

* cited by examiner

LIQUID CRYSTAL DISPLAY DEVICE

BACKGROUND OF THE INVENTION

1. Field of the Invention

The present invention relates to a liquid crystal display device comprising a liquid crystal display panel and a backlight, and in particular, to a liquid crystal display device which utilizes a light emitting diode (hereinafter simply referred to as "LED") as a light source.

2. Description of Related Art

Among conventional liquid crystal display devices, transmissive-type and transflective-type liquid crystal display devices are each provided with a liquid crystal display panel and a backlight for supplying light transmitting through the liquid crystal panel.

Generally, a backlight includes a light source and a light-guiding plate, and a small fluorescent tube called CCFL (cold cathode fluorescent tube) is used as the light source. One principal surface of the light-guiding plate is disposed so as to correspond to a display area of the liquid crystal display panel, and a diffusion area for diffusing and reflecting light toward the surface side is provided on the other principal surface thereof (referred to as "outer surface") opposite to the aforementioned principal surface.

The CCFL light source is disposed at an end surface of the light-guiding plate so that light of CCFL incident on the end surface of the light-guiding plate is transmitted inside the light-guiding plate, and is diffused/reflected on the outer surface side of the light-guiding plate to be directed from the surface of the light-guiding plate toward the liquid crystal panel. Thus, the light source is converted from a linear light source into a homogeneous planar light source to be utilized as the light source for the liquid crystal device.

However, this CCFL light source uses Hg (mercury) encapsulated in a discharge tube that emits ultraviolet rays when excited by electrical discharge, which strike the fluorescent substance on the CCFL tube wall to be converted into visible light rays.

For this reason, when considering the environmental aspect, using an alternative light source is required for restricting the use of hazardous mercury.

In addition, in order to illuminate the CCFL, a high-voltage and high-frequency switching circuit is necessary. However, since this causes high frequency noise, not only noise prevention is additionally required, but also problems such as slow light-up under low temperature, low luminous efficiency and the like are prone to arise.

In the meantime, as a new light source, an LED backlight utilizing a light emitting diode module (LED light source) accommodating LED chips characterized by a point light source has been developed.

With demands for lower price, higher luminous efficiency and environmental regulations, this backlight utilizing the LED light source is becoming to be widely used as the backlight for liquid crystal display panels.

At the same time, with increased brightness and display area of liquid crystal display devices, the demand for providing a plurality of LED light sources is increasingly high.

Accordingly, when an LED backlight is used for a high brightness, large size liquid crystal display panel, the LED light source, which is a point light source, needs to be converted into a planar light source that emits light rays evenly (light source that has been converted into even light rays at the light-emitting surface of the light-guiding plate). For this reason, it is necessary to adjust the material and structure of the diffusion area of the outer surface of the light-guiding plate, and to dispose the LED light source at an optimum position in accordance with the orientation of the LED light source.

However, one problem here is that the temperature of the LED and its peripheral regions rises due to heat generated from the LED chip, leading to decrease in luminous efficiency and life of the LED light source.

Therefore, in a liquid crystal display device provided with a LED backlight, reduction of heat storage in the mounting board on which the LED light source is mounted and suppression of temperature rise in the LED light source are required.

SUMMARY OF THE INVENTION

A liquid crystal display device according to the present invention comprises a liquid crystal display panel including a display pixel area, a backlight and a heat sink member. The backlight includes a light-guiding plate disposed on one principal surface of the liquid crystal panel so as to correspond to the foregoing display pixel area, LED light sources arranged at an end portion of the light-guiding plate, a mounting board on which the LED light sources are mounted, and a thermally conductive member connected to the mounting board. The heat sink member is connected to the mounting board through the thermally conductive member.

Advantages, features and effects of the present invention will be apparent from the following description of preferred embodiments with reference to the accompanying drawings.

DETAILED DESCRIPTION OF PREFERRED EMBODIMENTS

Figure 1:
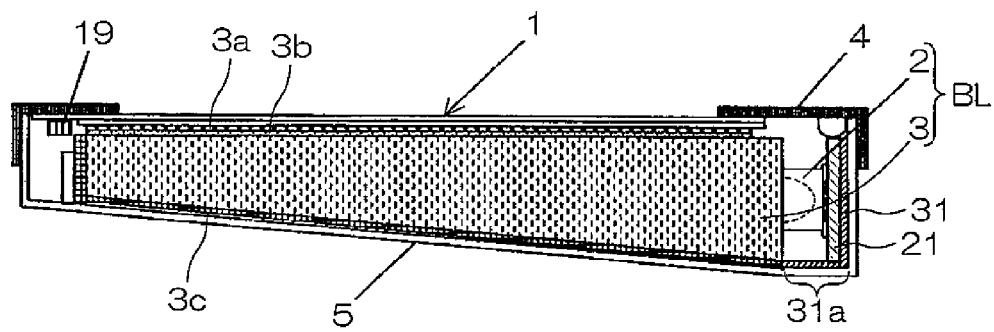
FIG. 1 is a cross-sectional view of a liquid crystal display device according to one embodiment of the present invention.
Figure 2:
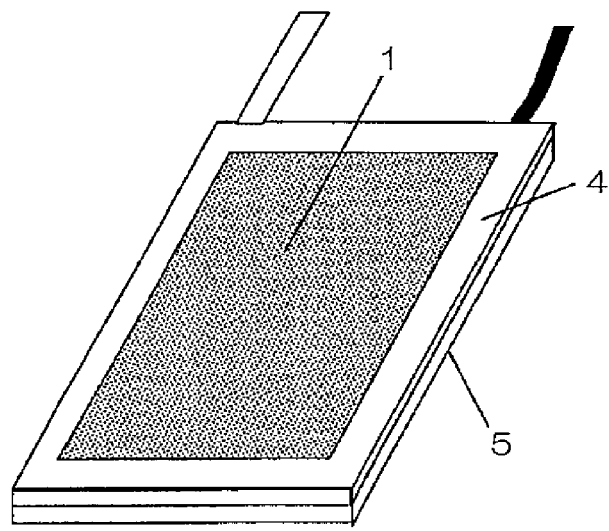
FIG. 2 is a schematic perspective view of a liquid crystal display device according to the present invention.
Figure 3:
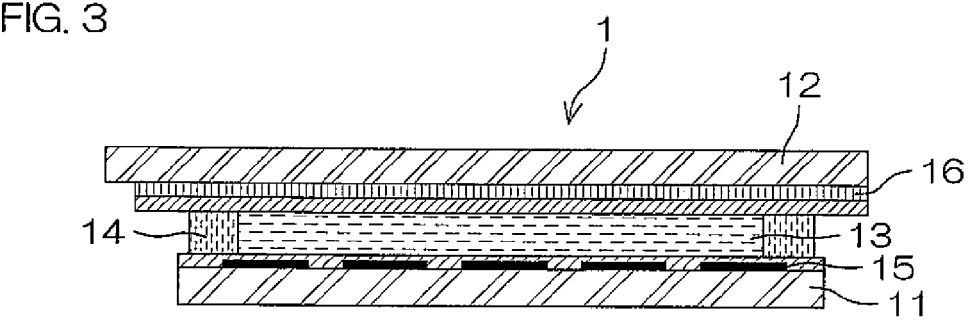
FIG. 3 is a cross-sectional view showing the structure of a liquid crystal panel used for a liquid crystal display device according to the present invention.

FIG. 1 is a schematic cross-sectional view of a liquid crystal display device according to the present invention, and FIG. 2 is a perspective view of the liquid crystal display device. FIG. 3 is a cross-sectional view of a liquid crystal display panel used for a liquid crystal display device according to the present invention.

This liquid crystal display device is composed mainly of a passive-type liquid crystal panel 1, a backlight BL including a light-guiding plate 3 and a LED light source 2, and an upper housing member 4 and a lower housing member 5 for protecting the liquid crystal panel 1 and the backlight BL.

The upper housing member 4 is provided for protecting an outer peripheral area of the liquid crystal panel 1. The lower housing member 5 protects the backlight BL, as well as functions as a heat sink member for dissipating heat generated from the LED light sources 2 of the backlight BL to the outside. In this case, the lower housing member 5 is referred to as "heat sink member 5" for its heat dissipating function.
<Liquid Crystal Panel>

The liquid crystal panel 1 comprises, as shown in FIG. 3, an upper transparent substrate 12 as a substrate of one side, and a lower transparent substrate 11 as a substrate of another side, a liquid crystal layer 13 interposed between the both transparent substrates 11, 12. The liquid crystal layer 13 is surrounded by a sealing section 14.

In addition, display electrodes 15, an alignment film and the like that are not shown are formed on the interior surface of the lower transparent substrate 11, and display electrodes 16, an alignment film and the like are also formed on the interior surface of the upper transparent substrate 12.

These display electrodes 15 of the lower transparent substrate 11 and the display electrodes 16 of the upper transparent substrate 12 constitute a plurality of pixel areas aligned in the form of a matrix, and the plurality of pixel areas form a display pixel area.

In addition, the lower transparent substrate 11 and the upper transparent substrate 12 are each provided with a polarization plate, a retardation film, a diffusion film and the like according to need, although they are not shown in the drawings.

Meanwhile, when this liquid crystal display device is a transmissive liquid crystal display device, usually, the display electrodes 15, 16 are composed of transparent electrodes, and the display pixel area transmits light from the backlight BL to the display surface side.

When it is a transflective liquid crystal display device, the display pixel area includes a partially light reflective area comprising a reflective metal film, and a partially light transmissive area that permits light from the backlight BL to penetrate.

In this transflective liquid crystal display device, external light entering from the display area side is reflected at the light reflective area of the display pixel area to be returned to the display area side, and light of the backlight BL is transmitted at the light transmissive area.

This structure enables display in the reflective mode when the external light is intense, and display in the transmissive mode when the external light is weak.

In addition, in order to accomplish color display, it is possible to provide a color filter in the display pixel area of either the lower transparent substrate 11 or the upper transparent substrate 12.

The liquid crystal display device according to the present invention may include switching devices formed in the respective pixel areas of either the lower transparent substrate 11 or the upper transparent substrate 12 so as to control display for each pixel area.

Moreover, it is also possible to provide a wiring pattern at the periphery the display pixel area of either of the lower and upper transparent substrates 11, 12, for example, the upper transparent substrate 12, which is electrically connected to display electrodes 16, the aforementioned switching devices formed in the respective pixel areas and the like so that an active type liquid crystal display panel can be constructed by providing the wiring pattern with a drive circuit for supplying a predetermined signal and a predetermined voltage and an input terminal for connection to an external drive circuit.

The display electrodes of the substrate that is not provided with the wiring pattern, for example, the display electrodes 15 of the lower transparent substrate 11 may be electrically connected to the wiring pattern of the upper transparent substrate 12 through a conductive filler inside the sealing section 14 disposed at the periphery between both substrates 11 and 12.

The material for the lower transparent substrate 11 and the upper transparent substrate 12 may be glass, translucent plastic or the like. The display electrodes 15, 16 are formed using a transparent conductive material such as ITO, tin oxide or the like. The reflective metal film constituting the light reflection area is made of aluminum, titanium or the like. In addition, the alignment film is made of rubbed polyimide. When color filters are provided, resin to which dyes and pigments are added is used to form red, green, and blue filters for each pixel area. It is also possible to provide black resin between the respective filters and around the pixel areas for a light-shielding purpose.

These lower transparent substrate 11 and upper transparent substrate 12 are joined through the sealing section 14 by pressure, and a liquid crystal material including nematic liquid crystal or the like is injected from an opening provided in the sealing section 14, and then the opening is sealed.

The joining is carried out so that the display electrodes 15 and 16 aligned on the transparent substrates 11 and 12, respectively, are two-dimensionally cross each other. An area at which a display electrode 15 and a display electrode 16 are opposed to each other forms a pixel area, and an assembly of the pixel areas forms a display pixel area.

The passive type liquid crystal display panel 1 is constructed in the foregoing manner.

<Backlight>

A backlight BL is disposed outside (in the lower side in FIG. 1) of the lower transparent substrate 11 of the liquid crystal display panel 1.

As shown in FIG. 1, the backlight BL is provided with an LED light source 2, a light-guiding plate 3, a lens sheet 3a, a diffusion sheet 3b, a reflection sheet 3c, an elongated mounting board 21 disposed generally in parallel to an end surface of the light-guiding plate 3, and a thermally conductive sheet 31 as a thermally conductive member. The thermally conductive sheet 31 is in tight attachment to a heat sink member 5 and the mounting board 21.

The thermal conductivity of the thermally conductive sheet 31 is preferably at least 0.3 W/(m·K), and more preferably, greater than the thermal conductivity of the mounting board 21. For example, when the mounting board 21 comprises a glass epoxy substrate, the thermally conductive sheet 31 preferably has a thermal conductivity greater than the thermal conductivity 0.45 W/(m·K) of the glass epoxy substrate.

Here, the thermally conductive sheet 31 is preferably made of soft rubber so that it excludes air (its thermal conductivity is 0.024 W/(m·K)) from its contact surface with the heat sink member 5 or its contact surface with the mounting board 21. Specifically, the thermally conductive sheet 31 preferably has a JIS-A rubber hardness of 5-60 degree (defined in JIS-K6253). With a JIS-A rubber hardness lower than 5, the thermally conductive sheet 31 is too soft to keep the position of itself stable. With a JIS-A rubber hardness greater than 60, the thermally conductive sheet 31 is so hard that its adhesion to the mounting board 21 and the heat sink member 5 weakens and fails to effectively exclude air from the aforementioned contact surfaces.

The light-guiding plate 3 has a shape corresponding to the display area of the liquid crystal panel 1. One principal surface of the light-guiding plate 3 (the surface from which light is emitted) is disposed so as to be opposed to the lower transparent substrate 11.

The light-guiding plate 3 comprises a transparent resin plate. A light diffusing material may be included in the resin component. A lens sheet 3a and a diffusion sheet 3b are disposed on the one principal surface of the light-guiding plate 3, and on another principal surface (referred to as "outer surface") of the light-guiding plate 3, a reflection sheet 3c for radiating light that propagates inside the light-guiding plate 3 to the side of the one principal surface is disposed.

Instead of the reflection sheet 3c, grooves for directly diffusing/reflecting light, or a film having a diffusing/reflecting function may be formed on the outer surface of the light-guiding plate 3.

In addition, the reflection sheet 3c may be formed on three of the four end surfaces of the light-guiding plate 3 excluding the end surface on which the LED light sources 2 are disposed.

Figure 4:
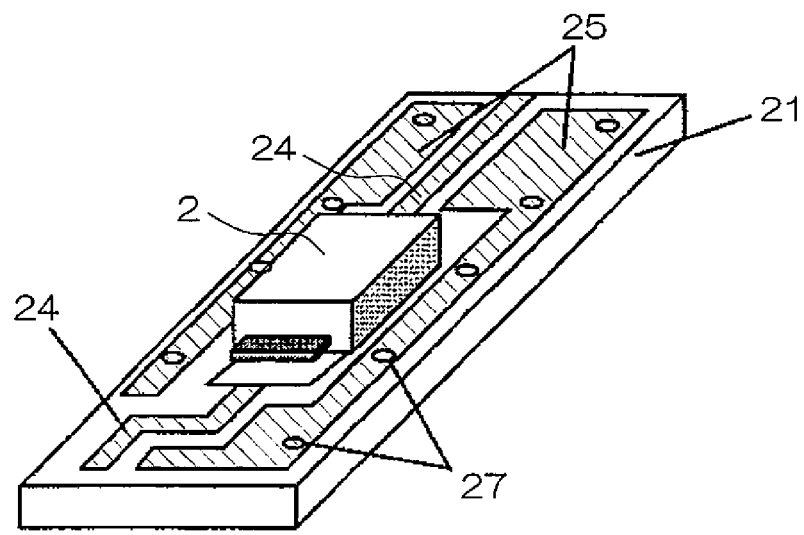
FIG. 4 is a schematic perspective view of a mounting board on which an LED light source is mounted viewed from the LED mounting surface side.
Figure 6:
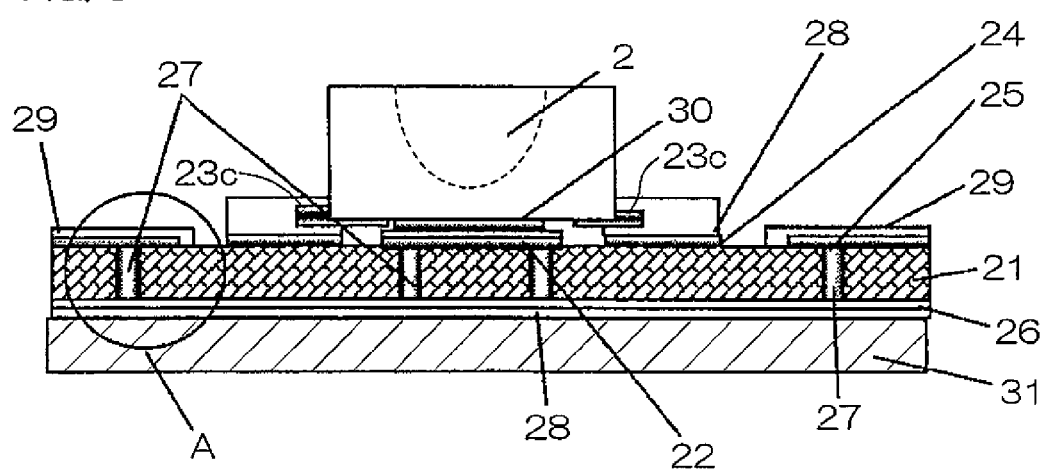
FIG. 6 is a schematic cross-sectional view of a mounting board on which an LED light source according to the present invention is mounted.
Figure 8:
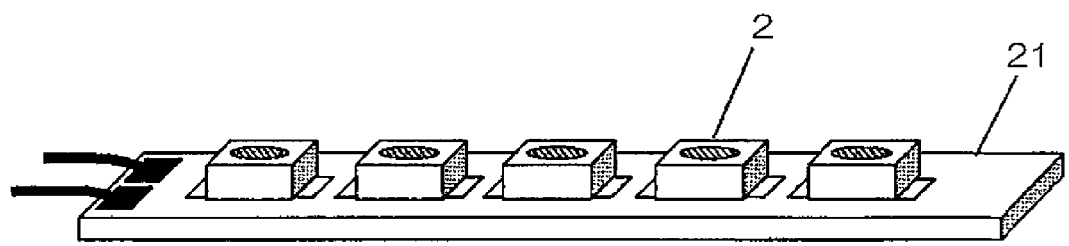
FIG. 8 is a schematic perspective view of an LED light source array including a plurality of LED light sources mounted on a mounting board.

The LED light sources 2 are mounted on the mounting board 21 as shown in FIGS. 4, 6 and 8.

Figure 9:
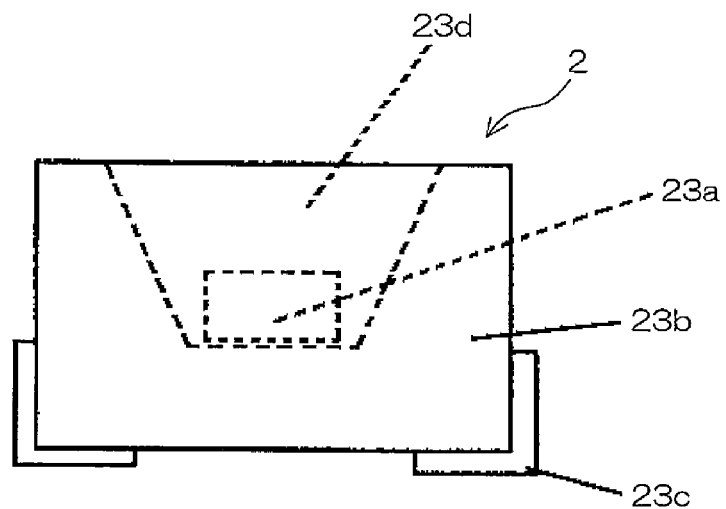
FIG. 9 is a schematic view showing the structure of an LED light source.

The LED light source 2 whose cross-section is shown in FIG. 9 comprises an LED chip 23a including a light-emitting section made of a semiconductor material, an anode electrode and a cathode electrode, and an LED container 23b made of a heat-resistant resin material, a ceramic material or the like that has a cavity 23d for accommodating the LED chip 23a.

This LED container 23b of the LED light source 2 has a light-emitting surface, a back surface opposed to the mounting board 21, and four side surfaces, and the light-emitting surface of the LED container 23b is disposed so as to be in tight attachment to the end surface of the light-guiding plate 3 as shown in FIG. 1.

The cavity 23d is formed on the light-emitting surface of the LED container 23b, and the LED chip 23a is disposed on a bottom part of the cavity 23d.

The anode electrode and cathode electrode of the LED chip 23a are electrically connected to terminal portions 23c formed over side surfaces and the back surface of the LED container 23b.

Meanwhile, a reflective coating may be applied to the inner wall surface of the cavity 23d. Also, the interior of the cavity 23d may be filled with a translucent resin so as to cover the LED chip 23a. When the interior of the cavity 23d is filled with a translucent resin, the light-emitting surface of the LED container 23b corresponds to the surface of the translucent resin. When the cavity is not filled with a translucent resin, the light-emitting surface of the LED container 23b corresponds to an opening of the cavity 23d.

A plurality of the LED light sources 2 with the structure described above are mounted in a linear arrangement with intervals therebetween on the mounting board 21 with an elongated shape as shown in FIG. 8. The assembly including a plurality of mounted LED light sources 2 and the mounting board 21 is referred to as "LED light source array".

The mounting board 21 comprises a glass fabric-based epoxy resin substrate or a ceramic substrate.

On the LED-mounting surface of the mounting board 21, there are provided a mounting metal film 22 for mounting the LED light sources 2, a metal driving wiring 24 for supplying driving current to the LED chips 23a and a metal film pattern 25 disposed being spaced apart from the metal driving wiring 24.

Figure 5:
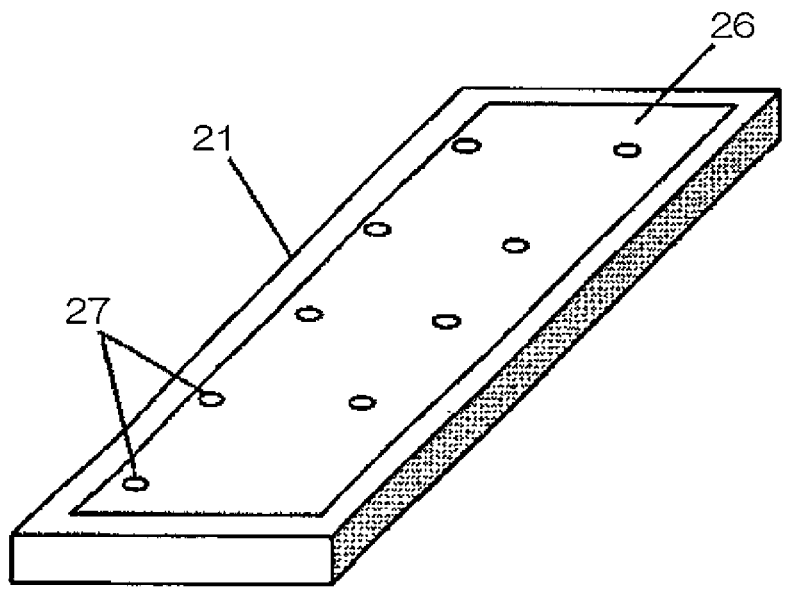
FIG. 5 is a schematic perspective view of the mounting board on which an LED light source is mounted viewed from the rear surface side.

In addition, on the surface opposite to the LED-mounting surface, that is, the back surface of the substrate, a heat dissipating metal film 26 is formed to cover generally the entire surface as shown in FIG. 5.

Moreover, a plurality of metal via hole conductors 27 for connecting the metal mounting film 22 and the heat dissipating metal film 26 are formed in the thickness direction of the mounting board 21.

Terminal portions 23c of the LED light sources 2 are connected to the metal driving wiring 24 through a conductive bonding member 28 comprising solder or the like.

Figure 7:
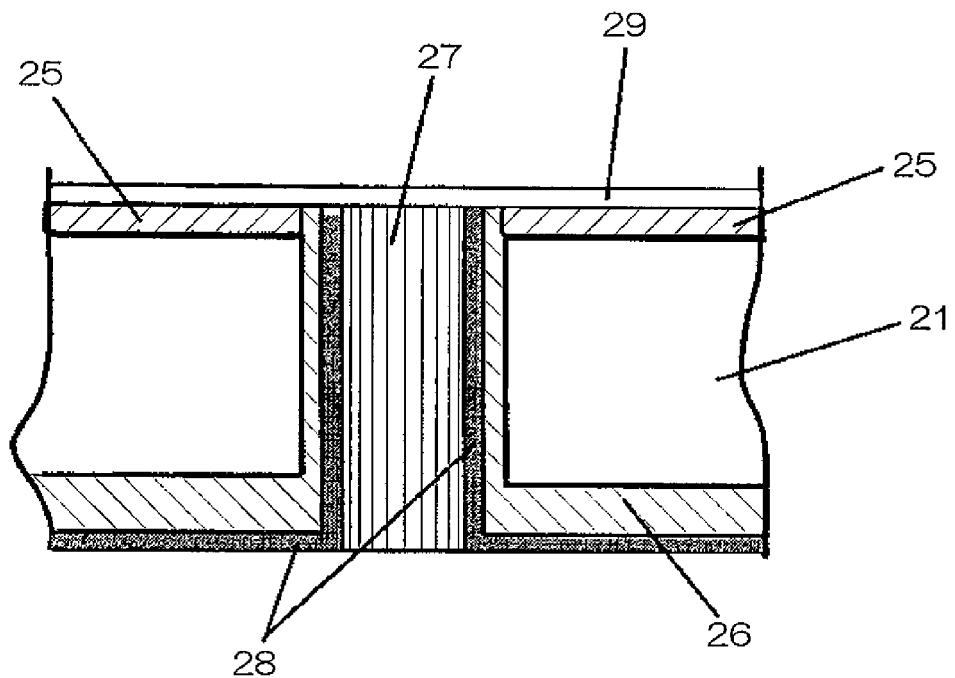
FIG. 7 is an enlarged view of the part A of FIG. 6.

The metal mounting film 22, the metal driving wiring 24, the metal film pattern 25, the heat dissipating metal film 26, and the metal via hole conductors 27 respectively are formed using copper or a copper-based metal material (copper material, copper plating or the like). A part of the metal driving wiring 24, metal mounting film 22, heat dissipating metal film 26 and metal via hole conductors 27 are covered with solder (referred to as "heat dissipating metal film 28") as shown in FIG. 7, which is an enlarged view of the circled region A in FIG. 6.

The surface of the metal film pattern 25 is covered with a resin resist film 29. When this resist film 29 is white, light leaking from the LED light sources 2 can be efficiently supplied to the light-guiding plate 3.

<Heat Dissipating Structure>

Now, the structure for dissipating heat generated from the LED light sources 2 is described.

Upon driving the backlight BL (lighting up of the LED light sources 2) of the liquid crystal display device, heat is generated accompanying the light emission.

Heat generated from the LED chips 23a inside the LED light sources 2 needs to be transferred through the LED containers 23b and the mounting board 21 to a member having a wider area, and dissipated to the outside air from the member.

In order to accomplish such heat dissipation, the back surface of the mounting board 21 on which the LED light sources 2 are mounted is connected to the heat sink member 5, which is a metallic plate, through the thermally conductive sheet 31. This heat sink member 5 is bent so as to be opposed to the outer surface of the light-guiding plate 3, the back surface of the mounting board 21 and a side surface of the mounting board 21.

The heat sink member 5 may be provided with thermally conductive apertures in a region opposed to the outer surface of the light-guiding plate 3 for increasing contact with the outside air according to need.

The heat sink member 5 is in tight attachment to the heat dissipating metal film 26 of the mounting board 21 through the thermally conductive sheet 31 as shown in FIG. 1.

Figure 10:
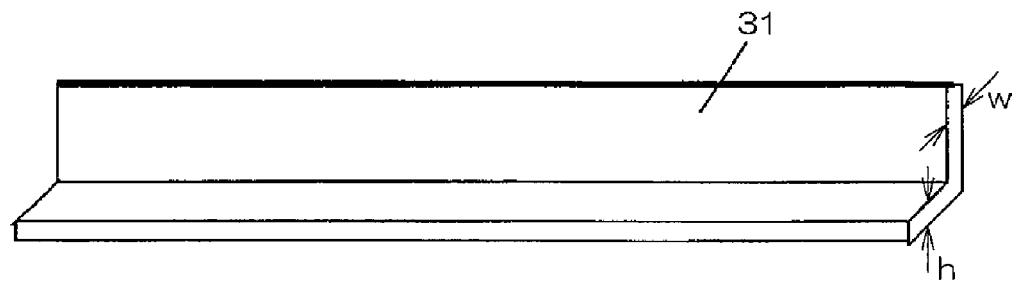
FIG. 10 is a perspective view of an L-shaped thermally conductive member.

FIG. 10 shows a perspective view of this thermally conductive sheet 31.

The thermally conductive sheet 31 covers the back surface of the mounting board 21, as well as includes an extended portion 31a that covers at least one of side surfaces connecting the back surface to the foregoing LED-mounting surface, and the extended portion 31a is also connected to the foregoing heat sink member 5 (See FIG. 1).

This thermally conductive sheet 31 and the heat sink member 5 are in surface contact with each other.

Since this thermally conductive sheet 31 is made of soft rubber, even when minute irregularities are present on the surfaces of the mounting board 21 and the heat sink member 5, interposition of air gaps between the mounting board 21 and the thermally conductive sheet 31 and between the thermally conductive sheet 31 and the heat sink member 5 is restricted. As a result, the thermally conductive sheet 31 and the heat sink member 5, and the mounting board 21 and the heat sink member 5, respectively, are brought into surface contact with each other in good condition. This structure transfers the heat generated from the LED light sources 2 from the LED container 23b to the mounting board 21, and stably conducts to the heat sink member 5 through the thermally conductive sheet 31. This makes it possible to transfer the heat generated from the LED chips 23 to the heat sink member 5, and as a result, to decrease the temperature of the LED light sources 2 and regions around them.

In particular, because of the arrangement in which the thermally conductive sheet 31 is in contact with the back surface and an end surface of the mounting board 21, heat can be transferred also from the end surface of the mounting board 21 through the thermally conductive sheet 31. Accordingly, the heat stored in the mounting board 21 can be transferred efficiently to the heat sink member 5.

Here, as shown in FIG. 10, the thermally conductive sheet 31 is designed so that the thickness thereof before it is interposed between the mounting board 21 and the heat sink member 5 is slightly greater than the distance between the mounting board 21 and the heat sink member 5. Because of this, the thermally conductive sheet 31 is pressed strongly by the mounting board 21 and the heat sink member 5 when the thermally conductive sheet 31 is interposed between the mounting board 21 and the heat sink member 5, which favorably restricts gap generation at contact surfaces between the mounting board 21 and the heat sink member 5.

In addition, it is preferable to planarize the end surface of the mounting board 21 with which the thermally conductive sheet 31 is brought into contact by grinding and polishing. This allows the thermally conductive sheet 31 to attach tightly to the end surface of the mounting board 21 in good condition.

In particular, since glass and plastic chippings produced in edge line portions of the end surface of the mounting board 21 can be removed by polishing, it is possible to effectively prevent air gaps from generating between the mounting board 21 and the thermally conductive sheet 31, and to dissipate heat efficiently.

Moreover, it is also possible to preclude light blocking effect due to the adherence of glass and plastic chippings produced from the cut surface of the mounting board 21 to the LED light sources 2, so that light of the light sources 2 can be utilized efficiently.

Now, the structure of another thermally conductive member which is effectively used together with the thermally conductive sheet 31 is described.

Figure 11A:
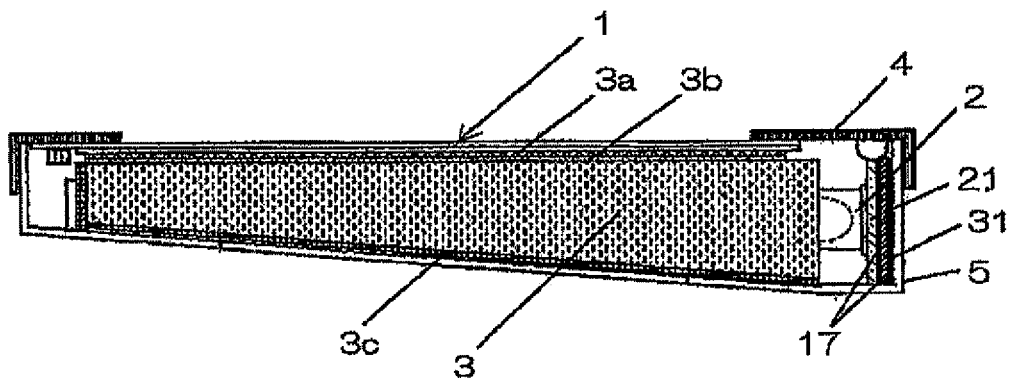
FIG. 11A is a schematic cross-sectional view of a liquid crystal display device according to another embodiment of the present invention.
Figure 11B:
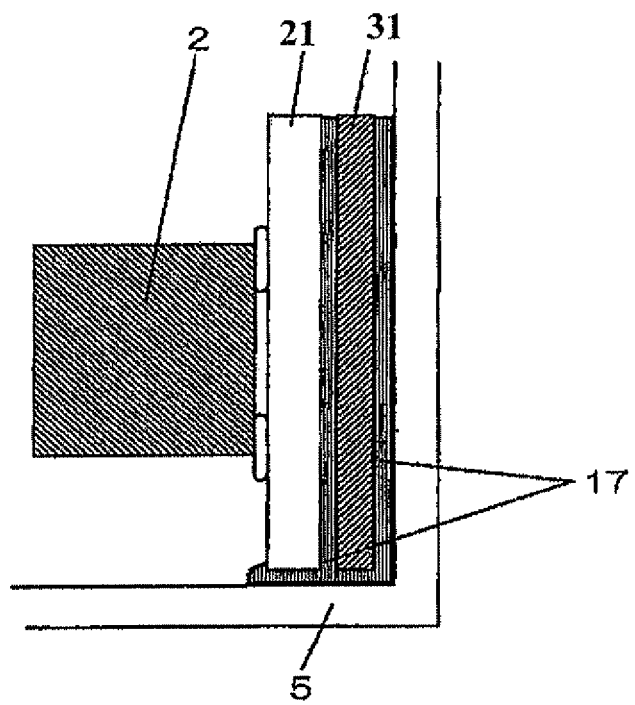
FIG. 11B is a partially enlarged view of FIG. 11A.

FIG. 11A shows a schematic cross-sectional view of a liquid crystal display device according to the present invention, and FIG. 11B is a partially enlarged cross-sectional view of the device in FIG. 11A. The same elements as in FIG. 1 are denoted by the same reference numerals. Features that are different from those in FIG. 1 are mainly described below.

Even though the thermally conductive sheet 31 is made of a soft rubber sheet material and held between the mounting board 21 and the heat sink member 5 in a pressure contacted manner, air gaps might be generated at contact surfaces between the mounting board 21 and the thermally conductive sheet 31 and between the thermally conductive sheet 31 and the heat sink member 5.

This is because the contact surfaces at which the mounting board 21 and the heat sink member 5 are in contact with the thermally conductive sheet 31 are not completely smooth surfaces but inevitably include minute irregularities, and the holding condition of the thermally conductive sheet 31 is subject to changes due to impact or the like from the outside.

Therefore, in order to prevent air gaps from generating, as shown in FIG. 11B, an adhesive agent 17 with high fluidity or a fluid 17 with large thermal conductivity and low fluidity is interposed between the thermally conductive sheet 31 and the mounting board 21 and between the thermally conductive sheet 31 and the heat sink member 5.

When the thermally conductive sheet 31 and the mounting board 21, and the thermally conductive sheet 31 and the heat sink member 5 are secured to each other with use of the adhesive agent 17 with high fluidity, air gap generation is further suppressed, so that the heat of the light sources 2 can be easily transferred to the heat sink member 5.

As the adhesive agent 17 with high fluidity, for example, silicone adhesives (such as SE9176L, an adhesive agent produced by Dow Corning Toray Silicone Co., Ltd.) may be used.

The adhesive agent 17 is used for bonding the thermally conductive sheet 31 and the heat sink member 5 together by being stably interposed therebetween, and therefore, high fluidity is required for the adhesive. Specifically, the viscosity before curing is preferably 2-20 Pa·S. Meanwhile, this adhesive agent is preferably of a type that hardens at room temperature.

When the viscosity of the adhesive agent 17 before curing is less than 2, the adhesive agent 17 flows out, causing bonding strength to be decreased. When the viscosity of the adhesive agent 17 before curing exceeds 20, it fails to be stably filled between the mounting board 21 and the heat sink member 5, and as a result, they are bonded together with trapping air therebetween.

The fluid 17 with low fluidity comprises, for example, a silicone oil component and ceramic fine particles with large thermal conductivity (which is referred to as "thermally conductive compound").

Here, a bonding function is not particularly required for the fluid, but expected only to suppress formation of air gaps between the mounting board 21 and the thermally conductive member 31, and between the thermally conductive member 31 and the heat sink member 5. For this purpose, oil components in the form of paste or grease may be recited. This fluid preferably has quite low fluidity, that is, hardly flows, unlike the adhesive agent.

Because of the presence of the fluid 17, minute irregularities on the mounting board 21 and the heat sink member 5 are impregnated with the oil component of the fluid 17, thereby eliminating minute air gaps. This allows heat to be transferred efficiently from the mounting board 21 to the heat sink member 5 through the thermally conductive sheet 31.

Accordingly, the heat generated at the light sources 2 is effectively dissipated to the outside, and becomes less likely to be stored in the LED light sources 2 and mounting board 21. As a result, temperature rise in the LED light sources 2 and regions around them can be effectively suppressed.

Still another member that is favorably used with the thermally conductive sheet 31 will be described below.

Figure 12:
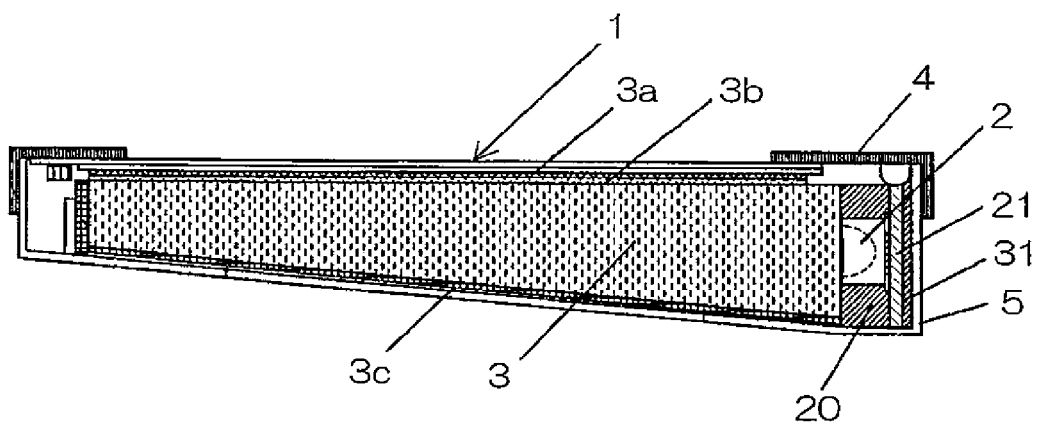
FIG. 12 is a schematic cross-sectional view of a liquid crystal display device according to still another embodiment of the present invention.

FIG. 12 shows a schematic cross-sectional view of a liquid crystal display device according to another embodiment of the present invention. The same elements as in FIG. 1 are denoted by the same reference numerals. Features that are different from those in FIG. 1 are mainly described below.

In this embodiment, a thermally conductive member 20 is disposed being in contact with a surface of a mounting board 21 on which a LED light source 2 is mounted.

Figure 13:
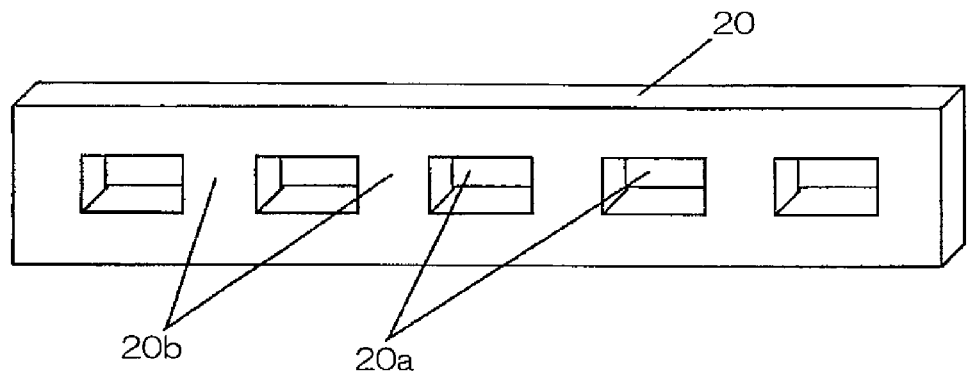
FIG. 13 is a perspective view of a second thermally conductive member.
Figure 14:
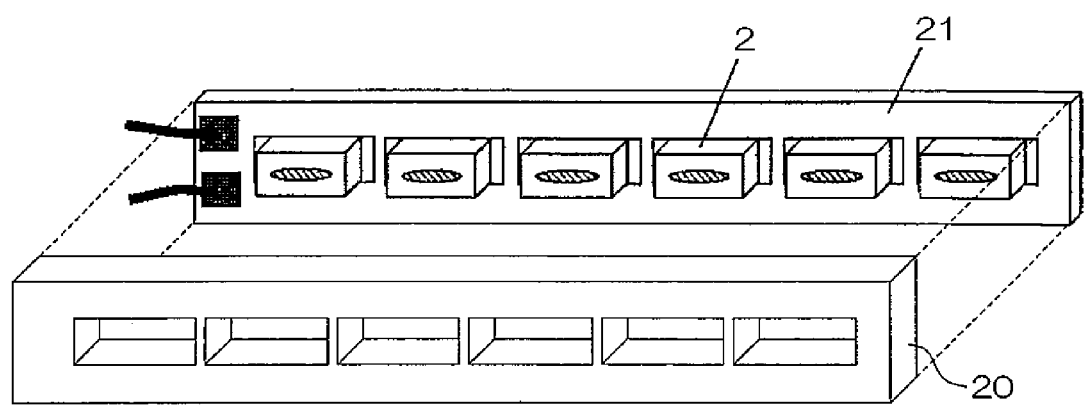
FIG. 14 is a schematic perspective view of an LED light source array to which the second thermally conductive member is press fitted.

FIG. 13 shows a perspective view of the thermally conductive member 20. FIG. 14 shows a perspective view of parts including a mounting board 21 and the LED light sources 2 mounted thereon, and the thermally conductive member 20 to be assembled thereto.

The thermally conductive member 20 has an elongated shape almost corresponding to the shape of the mounting board 21, and has window-like opening portions 20a for accommodating the LED light sources 2 mounted on the mounting board 21.

As shown in FIG. 14, the thermally conductive member 20 with a configuration mentioned-above is disposed on the LED-mounting surface of the mounting board 21. This is accomplished by placing the LED light sources 2 that have been mounted on the mounting board 21 at the opening portions 20a and pressing them into the opening portions 20a.

The thermally conductive member 20 is held between the mounting board 21 and the end surface on the light incident surface side of the light-guiding plate 3 as shown FIG. 12.

Since there is the thermally conductive member 20 substantially present around the light sources 2, most of the heat emitted from the LED light sources 2 to regions around the LED light sources 2 can be transferred to the heat sink member 5 through the thermally conductive member 20.

In particular, since the heat of the LED light sources 2 is rapidly transferred from the terminal portions 23c formed on the LED container 23b containing the LED through the metal wiring 24 formed on the mounting board 21, when the thermoconductive member 20 is brought into direct contact with electrode portions of the mounting board 21 as well as with the terminal portions 23c, the heat dissipating effect is further enhanced.

In addition, as shown in FIG. 12, because an end surface of the thermally conductive member 20 is in contact with the heat sink member 5, heat conduction from the thermally conductive member 20 to the heat sink member 5 is effectively accomplished through such a contact surface.

Accordingly, the heat generated at the LED light sources 2 is effectively dissipated to the outside, and becomes less likely to be stored in the LED light sources 2 and the mounting board 21, so that temperature rise in the LED light sources 2 or regions around them can be effectively suppressed.

Now, a description will be given to the thicknesses of the thermally conductive member 20 and the thermally conductive sheet 31.

It is important that the thickness of the thermally conductive member 20 at a stage before it is interposed between the mounting board 21 and the light-guiding plate 3 is slightly greater than the designed distance between the mounting board 21 and the light-guiding plate 3, in other words, the mounting height of the LED light source 2.

In addition, the thickness of the thermally conductive sheet 31 at a stage before it is interposed between the mounting board 21 and the heat sink member 5 should be slightly greater than the designed distance between the mounting board 21 and the heat sink member 5.

Since the both of the thermally conductive members 20 and 31 are made of soft rubber, when the thicknesses are set as above, the mounting board 21 with the LED light sources 2 mounted thereon is held between the light-guiding plate 3 and the heat sink member 5 in a pressure contacted manner, so that the mounting board 21 can be securely maintained.

Moreover, even when minute irregularities are present in the end surface of the light-guiding plate 3, the front and back surfaces of the mounting board 21 and the surface of the heat sink member 5, such minute irregularities are absorbed because of the rubber elasticity of the thermally conductive members 20, 31.

Accordingly, very few air gaps are present at the contact surfaces between the light-guiding plate 3 and the thermally conductive member 20, between the mounting board 21 and the thermally conductive sheet 31, and between the thermally conductive members 21, 30 and the heat sink member 5, and therefore, thermal conduction properties at these contact surfaces can be maintained to be high.

In addition, by the use of soft rubber for the thermally conductive members 20, 31, even when external impact is applied to the liquid crystal display device, the impact can be absorbed by the thermally conductive members 20, 31. Accordingly, the impact is prevented from propagating directly to the mounting board 21. As a result, displacement of the mounting board 21, breakage of the mounting board 21 itself, or detachment of the LED light sources 2 from the mounting board 21 no longer occurs.

Figure 15:
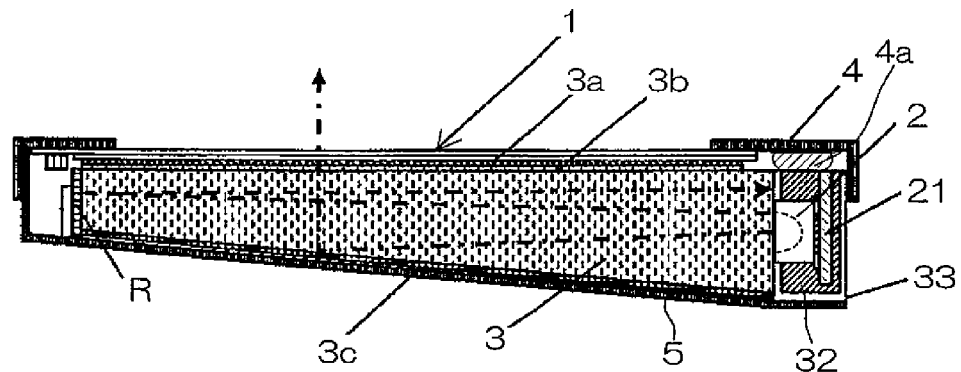
FIG. 15 is a schematic cross-sectional view of a liquid crystal display device according to yet another embodiment of the present invention.

FIG. 15 shows a schematic cross-sectional view of a liquid crystal display device according to still another embodiment of the present invention. The same elements as in FIG. 1 are denoted by the same reference numerals. Features that are different from those in FIG. 1 are mainly described below.

In this embodiment, a thermally conductive member 32 which covers the front and back surfaces of the mounting board 21 is provided.

FIG. 16 shows an example of the thermally conductive member 32 in a perspective view.

Figure 16A:
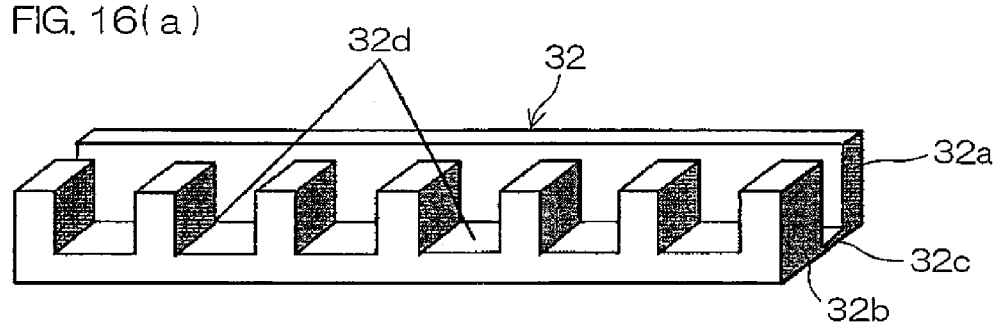
FIGS. 16 (a)-16(c) are perspective views of thermally conductive members each having a U-shaped cross section used for the liquid crystal display device shown in FIG. 15.

The thermally conductive member 32 comprises, as shown in FIG. 16(a), a first portion 32a held between the mounting board 21 and the heat sink member 5, a second portion 32b held between the mounting board 21 and the light-guiding plate 3 and a third portion 32c that connects the first portion 32a and second portion 32b, and covers at least one of the side surfaces of the mounting board 21.

The second portion 32b is provided with a plurality of opening portions 32d at positions corresponding to the LED light sources 2 mounted on the mounting board 21.

The opening portions 32d are open on the upper side. Placing the mounting board 21 on such a thermally conductive member 32 may be accomplished by press fitting it from the upper side of the gap between the first portion 32a and the second portion 32b downward with the LED light sources 2 being positioned at the opening portions 32d.

Here, it is preferable to interpose the aforementioned adhesive agent 17 with high fluidity or a fluid 17 with low fluidity between the thermally conductive member 32 and the mounting board 21, between the thermally conductive member 32 and the heat sink member 5, and between the heat sink member 5 and the light-guiding plate 3 so as to improve the thermal conduction.

FIGS. 16 (b), 16 (c) show other examples of the thermally conductive member 32.

Figure 16B:
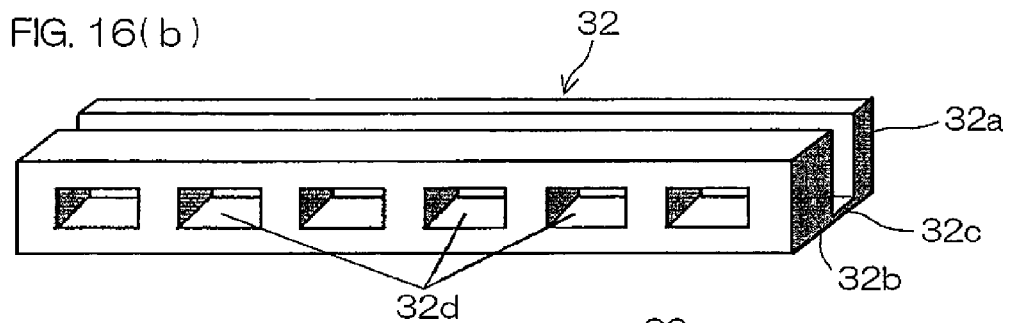

FIG. 16(b) shows an example in which opening portions 32d formed in a second portion 32b so as to correspond to the LED light sources 2 have window-like shapes.

In this case, since the thermally conductive member 32 is substantially present in four surfaces surrounding the LED light sources 2, most of the heat emitted from regions around the LED light sources 2 can be transferred through the thermally conductive member 32 to the light-guiding plate 3 and the heat sink member 5.

Meanwhile, the placement of the mounting board 21 on the thermally conductive member 32 may be accomplished such that with the gap between the first portion 32a and the second portion 32b expanded from the upper side, the mounting board 21 is inserted from the upper side.

Figure 16C:
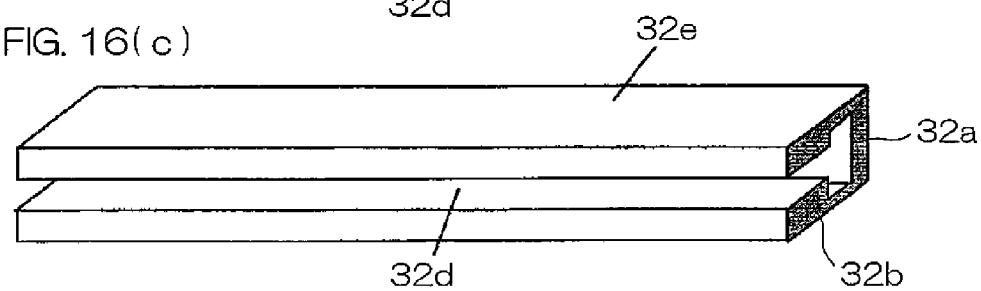

In addition, the thermally conductive member 32 may be U-shaped in cross-section as shown in FIG. 16(c) so that it is in contact with the front surface, the back surface and the end surface of the mounting board 21.

The thermally conductive member 32 in FIG. 16(c) includes a forth portion 32e at a position opposed to a second portion 32b and an opening portion 32d where LED light sources 2 are exposed so as to form a configuration corresponding to the cross-sectional shape of the mounting board 21.

In this case, the mounting board 21 is laterally inserted into the thermally conductive member 32 with a U-shaped cross section.

Meanwhile, the placement of the mounting board 21 on the thermally conductive member 32 is accomplished such that with the opening portion 32d formed in the second portion 32b vertically opened, the mounting board 21 is introduced. Or, the mounting board 21 may be press fit from a lateral side of the thermally conductive member 32.

Since substantially the four surfaces of the mounting board 21 are covered by the thermally conductive member 32 in the structure in FIG. 16(c), thermal conductive efficiency can be improved.

In addition, it is possible to press the thermally conductive member 32 and a side surface of the mounting board 21 from the upper side by a projected portion 4a provided in the housing 4 of the liquid crystal display device (See FIG. 15) so that the thermally conductive member 32 is held between the housing 4 and the heat sink member 5. Since the mounting board 21 is covered by the thermally conductive member 32 at four surfaces thereof, it exhibits excellent heat dissipation and impact resistance.

Now, a description will be given to thickness of the thermally conductive member 32. Since the thermally conductive member 32 is intended to hold the mounting board 21 and the heat sink member 5 in a pressure contacting manner, it is preferable to design the outer dimensions of the thermally conductive member 32 to be somewhat larger than the inner dimensions of the heat sink member 5.

Because the thermally conductive member 32 is made of a soft rubber sheet, minute irregularities on the surfaces of the mounting board 21 and the heat sink member 5 are absorbed, so that the mounting board 21 and the thermally conductive member 32, and the thermal conductive member 32 and the heat sink member 5 can be brought into surface contact with each other almost free from interposition of air gaps therebetween.

Further, there may be cases where a curved surface (R) is formed at an inner corner region of the heat sink member 5 that is in contact with the outer surface of the thermally conductive member 32 while the metal bending or the metal pressing process. However, gaps between the thermally conductive member 32 and the heat sink member 5 that are created by the curved surface are filled with the thermally conductive member 32 by the deformation of the thermally conductive member 32.

If the gaps cannot be filled with the thermally conductive member 32, the curved surface R can be removed by C-chamfering an outer corner region of the thermally conductive member 32 in contact with the inner curved region, so that the adhesion between the thermally conductive member 32 and the heat sink member 5 can be further improved.

It is also possible to attach a metal case 33 described below to the outer surfaces of the thermally conductive member 32 described above.

Figure 17A:
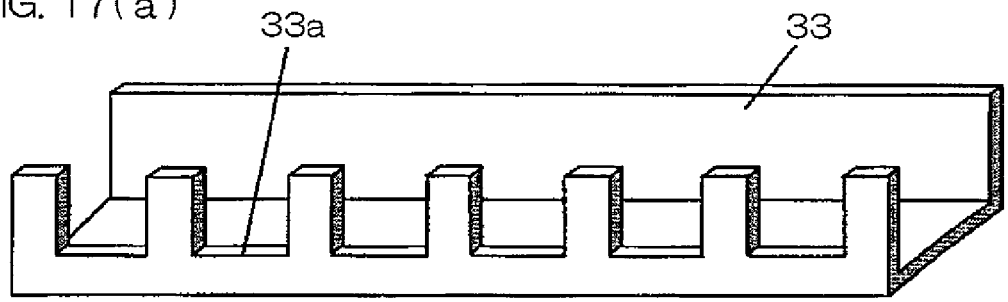
FIGS. 17 (a)-17(c) are perspective views of metal cases used for the respective thermally conductive members each having a U-shaped cross section.
Figure 17B:
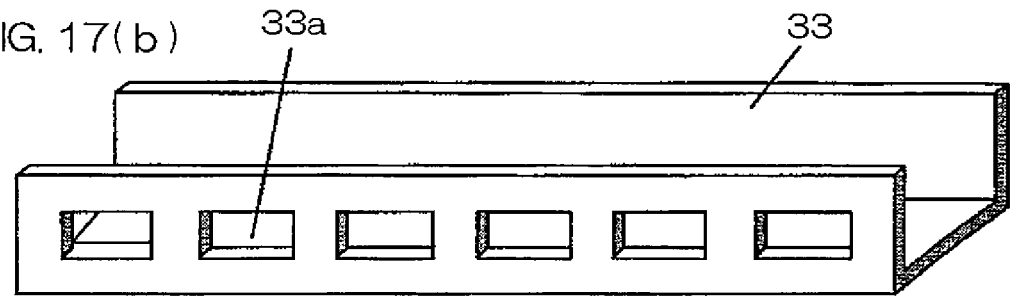
Figure 17C:
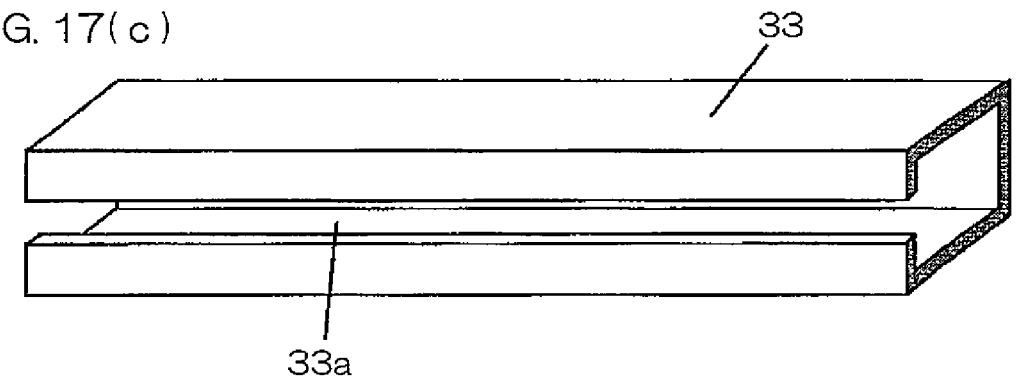

FIGS. 17(a)-17(c) are perspective views showing the configurations of a metal case 33 as a heat sink member enclosing the thermally conductive member 32.

Outer surfaces of the foregoing thermally conductive member 32 are covered with these metal cases 33.

The thermally conductive member 32 and the metal case 33 are tightly attached to each other at contact surfaces. Similarly to the thermally conductive member 32, the metal case 33 is provided with cutout portions 33a at which the light-emitting surfaces of the light sources 2 are exposed.

Meanwhile, the metal case 33 has an effect to improve the LED light source utilizing efficiency. Specifically, there are light rays which are not directed to the side of the liquid crystal panel 1 from the light-guiding plate 3 after entering the light-guiding plate 3 from the LED light source 2, but are reflected at a reflection plate R made of metal provided at an end surface of the light-guiding plate 3 to return to an end surface side of the LED light source 2 (See FIG. 15).

In such a case, if the thermally conductive member 32 is disposed at the end surface of the light-guiding plate 3, the thermally conductive member 32 with a gray or black color absorbs such light rays, causing loss of light.

Therefore, by disposing the metal case 33 on the outer surfaces of the thermally conductive member 32, light rays can be returned to the light-guiding plate 3 by the metal case 33, so that light is efficiently utilized.

The means for reflecting light rays that are coming back is not limited to the metal case 33, but may be other light reflective members or sheets disposed at predetermined regions of the thermally conductive member 32 for that purpose.

While the metal case 33 is formed by metal processing to have a U-shaped or C-shaped cross section in FIGS. 17(a)-(c), it may be formed to have a configuration enclosing the entire thermally conductive member 32, that is, annular in cross section.

The thermally conductive member 32 and the metal case 33 are preferably tightly attached to each other so as not to permit air gaps to interpose therebetween. For example, a silicone adhesive agent (e.g. adhesive SE9176L produced by Dow Corning Toray Silicone Co., Ltd.) may be applied between the thermally conductive member 32 and the metal case 33.

In addition, the metal case 33 is preferably fixed to the heat sink member 5 by means of a thermally conductive adhesive agent, by which heat of the thermally conductive member 32 is more easily transferred to the heat sink member 5. Moreover, when the metal case 33 and the heat sink member 5 are integrally formed, heat of the metal case 33 is directly transferred to the heat sink member 5. As the foregoing thermally conductive adhesive agent, for example, a thermally conductive adhesive agent SE4420 produced by Dow Corning Toray Silicone Co., Ltd. may be used.

Figure 18:
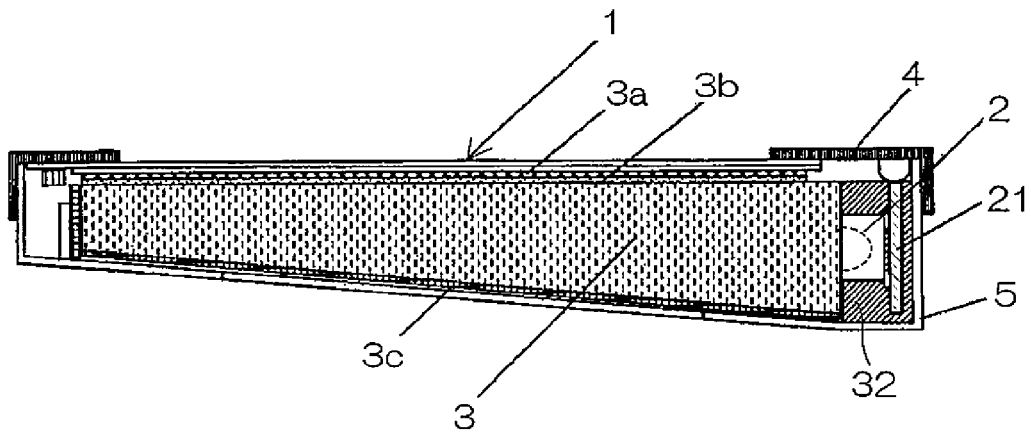
FIG. 18 is a schematic cross-sectional view of a liquid crystal display device according to still another embodiment of the present invention.

FIG. 18 is a schematic cross-sectional view of a liquid crystal display device according to another embodiment of the present invention. The same elements as in FIG. 15 are denoted by the same reference numerals. Features that are different from those in FIG. 15 are mainly described below.

In this embodiment, the thermally conductive member 32 is in tight attachment to an end surface of the light-guiding plate 3.

Since heat radiated to regions around the LED light source 2 and heat on the LED-mounting surface side of the mounting board 21 are transferred from the thermally conductive member 32 directly to the end surface of the light-guiding plate 3, such heat can be transferred to the light-guiding plate 3. Heat of the LED light source 2 can be transferred through the thermally conductive member 32 to the heat sink member 5. In addition, heat emitted from the mounting board 21 can be transferred through the thermally conductive member 32 interposed between the mounting board 21 and the heat sink member 5 to the heat sink member 5.

Here, the thickness of the thermally conductive member 32 at a stage before it is interposed between the mounting board 21 and the heat sink member 5 (thickness with respect to the thickness direction of the mounting board 21) is determined to be slightly greater than the designed distance between the mounting board 21 and the heat sink member 5 and the designed distance between the mounting board 21 and the light-guiding plate 3. This ensures that the thermally conductive member 32 is securely held between the mounting board 21 and the light-guiding plate 3 and between the mounting board 21 and the heat sink member 5 in a pressure contacted manner. As a result, generation of air gaps can be well prevented and heat can be dissipated efficiently.

Figure 19:
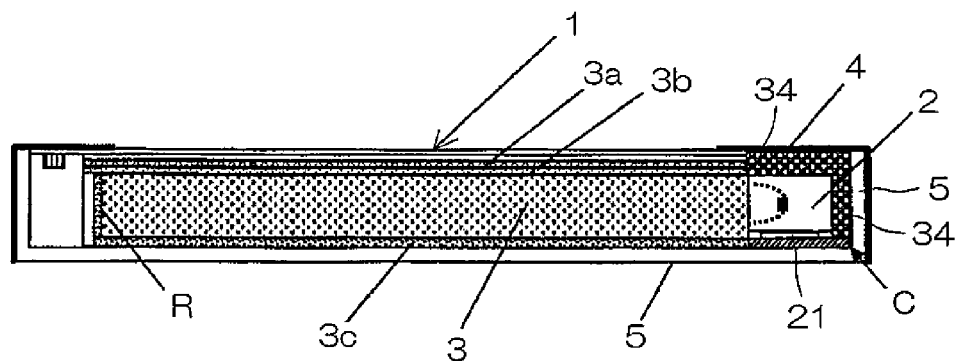
FIG. 19 is a schematic cross-sectional view of a liquid crystal display device according to yet another embodiment of the present invention.

FIG. 19 is a schematic cross-sectional view of a liquid crystal display device according to another embodiment of the present invention. The same elements as in FIG. 1 are denoted by the same reference numerals. Features that are different from those in FIG. 1 are mainly described below.

Figure 20:
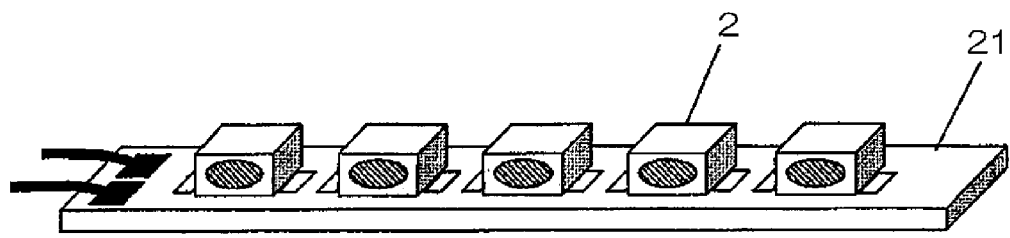
FIG. 20 is a schematic perspective view of an LED light source array used for the liquid crystal display device of FIG. 19.

In this embodiment, as shown in FIGS. 19 and 20, the surface (LED-mounting surface) of the mounting board 21 and the light-emitting surface of the LED container 23b constituting the LED light source 2 are disposed substantially perpendicular to each other.

Accordingly, the light-emitting direction of the LED light source 2 is parallel to the LED-mounting surface of the mounting board 21 as shown in FIG. 20.

In addition, the light-emitting surface and the back surface (the surface opposite to the light-emitting surface) of the LED light source 2 are covered with a thermally conductive member 34.

Figure 21:
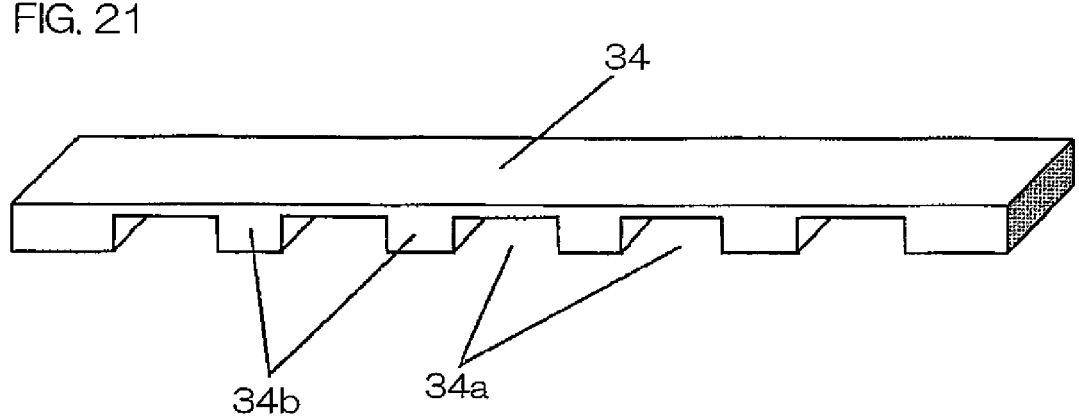
FIG. 21 is a schematic perspective view of a thermally conductive member used for the liquid crystal display device of FIG. 19.

This thermally conductive member 34 has a configuration including opening portions 34a that are open in the lower side for accommodating the LED light sources 2 as shown in FIG. 21 so as to surround four surfaces of the LED light source 2 joined to the mounting board 21 except one side surface and the light-emitting surface thereof.

The thermally conductive member 34 is pressed toward the mounting board 21 by the upper housing 4. In addition, the thermally conductive member 34 is pressed by the upper housing 4 and the heat sink member 5 from the back surface side of the LED light source 2 toward an end surface side of the light-guiding plate 3.

Accordingly, heat generated from the LED light sources 2 can be transferred to the upper housing 4 and the heat sink member 5 through the projected portions 34b of the thermally conductive member 34 present around the LED light sources 2.

As described above, since heat generated at LED light sources 2 is effectively dissipated to the outside and becomes less likely to be stored in the LED light sources 2 or the mounting board 21, temperature rise at the LED light sources 2 and regions around them can be effectively suppressed.

Meanwhile, while the opening portions 34a of the thermally conductive member 34 shown in FIG. 21 are provided so as to correspond to the plurality of LED light sources 2, the placement of the mounting board 21 on such a thermally conductive member 34 may be carried out by press fitting with the LED light sources 2 mounted on the mounting board 21 being positioned at the opening portions 34a.

Here, the thickness of the thermally conductive member 34 before it is interposed between the mounting board 21 and the upper housing 4 is preferably slightly greater than the designed distance between the mounting board 21 and the upper housing 4, and the thickness of the opening portions 34a are preferably about the same as the mounted thickness of the LED light sources 2.

By setting the thickness of the thermally conductive member 34 as above, the thermally conductive member 34 can be placed in tight attachment to the LED-mounting surface of the mounting board 21 and a side surface (the side surface between the light-emitting surface and the back surface that is opposite to the mounting board 21) of the LED light source 2.

Here, the thermally conductive member 34 is preferably made of soft rubber. Since this allows warpage and irregularities of the mounting board 21 and the heat sink member 5 to be absorbed, very few air gaps are permitted to interpose between the thermally conductive member 34 and the mounting board 21, between the thermally conductive member 34 and the heat sink member 5, and between the thermally conductive member 34 and the upper housing 4, so that they are tightly attached to each other in good condition, improving the heat dissipation.

Furthermore, since the thermally conductive member 34 is provided with the opening portions 34a for accommodating the LED light sources 2 and the projected portions 34b arranged between adjacent opening portions 34a are abutted with the LED-mounting surface of the mounting board 21, light rays other than those directed to the end surface of the light-guiding plate 3 are blocked or reflected. As a result, leakage of light can be prevented, and light utilization efficiency can be enhanced.

Meanwhile, since most of the heat of the LED light sources 2 is transferred from the terminal portions 23c through the metal wiring formed on the mounting board 21, heat dissipation effect is greater when the thermally conductive member 34 is brought into contact with the metal wiring of the mounting board 21 and further with the terminal portions 23c.

Now, a description will be given to an embodiment in which the LED light sources 2 are mounted on the mounting board 21 in such a way that thermal conduction from the LED light sources 2 to the mounting board 21 is improved.

In this embodiment, as shown in FIG. 6, the LED light source 2 is mounted on a mounting metal film 22 of the mounting board 21 through a heat dissipating bonding material 30 with good heat dissipating capability as well as adhesiveness.

The effect of interposing this heat dissipating bonding material 30 between the LED light source 2 and the mounting board 21 is as follows.

Usually, the LED light source 2 and the mounting board 21 are only connected at two positions, which are the connection terminal portions 23c, by means of an electrically conductive member or solder.

Accordingly, in conventional cases, heat generated at the LED chip 23a of the LED light source 2 is transferred from the LED container 23b to the mounting board 21 through the connection terminal portions 23c, and heat other than that is emitted to the ambient air around the LED container.

In comparison with this, according to the present invention, gaps (air layers) between the LED container 23b of the LED light source 2 and the mounting board 21 are eliminated to be filled with the heat dissipating bonding material 30. This allows the heat stored in the LED container 23b to be transferred efficiently to the mounting metal film 22 of the mounting board 21 through the heat dissipating bonding material 30. As a result, the heat can be transferred efficiently to the heat dissipating metal film 26 through a plurality of metal via holes 27.

Furthermore, by integrally forming the mounting metal film 22 and the metal film pattern 25, or even when the mounting metal film 22 and the metal film pattern 25 are formed separately, by applying the heat dissipating bonding material 30 so as to cover across the both, heat of the LED container 23b can be effectively transferred to the side of the mounting board 21 as well as to the heat dissipating metal film 26 through the plurality of via holes 27.

As described so far, owing to the use of the heat dissipating bonding material 30, the formation of the metal via holes 27 penetrating the mounting board 21 from the LED-mounting surface to the back surface thereof, the provision of the mounting metal film 22 and the metal film pattern 25 on the LED-mounting surface and the heat dissipating metal film 26 on the back surface of the mounting board 21 to increase the heat transfer effect of the metal via holes 27, and the use of a copper-based highly thermally conductive material for the mounting metal film 22, the heat dissipating metal film 26, the metal film pattern 25 and the metal via holes 27, heat of the LED container 23b of the LED light source 2 can be transferred efficiently to the side of the heat dissipating metal film 26 of the mounting board 21, so that temperature rise around the LED chip 21a can be suppressed effectively.

This heat dissipating bonding material 30 preferably has an insulating function in addition to the aforementioned heat dissipation and adhesiveness to prevent short circuit between the terminal portions 23c of the LED light source 2.

The heat dissipating bonding material 30 may be formed so that it is extended from the region in which the mounting metal film 22 is formed to reach the regions in which the metal via holes 27 are formed except for the regions of the metal film 24 to which the terminal portions 23c, 23c are joined.

In this structure, heat stored in the LED container 23b of the LED light source 2 can be transferred through the heat dissipating bonding material 30 not only to the mounting metal film 22, but also directly to the metal film 25, as well as to the dissipating metal film 26 on the back surface side of the mounting board 21 through many metal via holes 27.

Accordingly, it is possible to efficiently transfer heat stored in the LED container 23b of the LED light source 2 to the heat dissipating metal film 28 of the mounting board 21.

In order to obtain the same effect, the mounting metal film 22 may be extended so as to be formed substantially integrally with the metal film pattern 25 (in other words, connecting the mounting metal film 22 and the metal film pattern 25 together).

Another embodiment using a different means instead of the heat dissipating bonding material 30 will be described below.

In the case of a conventional surface mounting type LED light source 2, terminal portions 23b provided on both sides of the LED light source 2 and predetermined wiring connection terminals of the mounting board 21 are positioned at predetermined locations and connected to each other by means of a solder reflow method or the like.

However, air gaps with poor thermal conductivity tend to be generated between the LED container 23b accommodating the LED chip 23a of the LED light source 2 and the mounting board 21.

According to the present invention, an adhesive agent 35 with high fluidity is supplied to the air gaps by a dispenser coating method or the like.

For example, the LED light source 2 is mounted on the mounting board 21, and the adhesive agent is applied from one side of a LED case to be impregnated therewith. It is important that this adhesive agent with high fluidity is a material with high fluidity that does not corrode the metal wiring and the like.

Because of the high fluidity, the adhesive agent is distributed into gaps between the LED container 23b and the mounting board 21. As a result, formation of air gaps such as air bubbles are successfully prevented, so that the thermal conduction in this part is improved.

Accordingly, heat generated at the LED light source 2 is efficiently transferred to the mounting board 21 through the adhesive agent and the terminal portions 23c.

In addition, since mechanical joining between the LED light source 2 and the mounting board 21 is accomplished not only by the joints of the terminal portions 23c but also by the adhesive agent 30 provided between the LED container 23b and the mounting board 21, the mechanical joining strength between the LED light source 2 and the mounting board 21 can be increased, thereby realizing a liquid crystal display device with excellent impact resistance.

While specific embodiments of the present invention have been heretofore described, implementation of the present invention is not limited to the foregoing embodiments. For example, in many of the foregoing embodiments, although the light-guiding plate is thicker on the side of the end surface in the proximity of the LED light source 2 and thinner on the side of the end surface (the end surface opposite to the end surface in the proximity of the LED light source 2) apart from the LED light source 2, this relationship in thickness between both end surfaces may be reversed, or the light-guiding plate may be a flat plate member whose thickness is the same at the both end surfaces. Also, the sizes in the depth direction of the side surfaces of the lower side housing which also serves as the heat sink member 5 may be the same. In addition, while the heat sink member 5 is exposed at the back surface side of the liquid crystal display device because the heat sink member 5 also serves as the lower side housing, the heat sink member 5 and the lower housing may be formed as different members separately, or a resin may be molded and formed only on the surface on the side of the heat sink member 5 to be exposed so as to conform to the external appearance of the upper housing 4.

Example 1

A thermally conductive sheet (Model No. 5509 of Sumitomo 3M Limited) with heat dissipation properties shown in FIG. 10 was employed for the thermally conductive sheet 31, and a 2 mm thick aluminum was used for the heat sink member 5, so that the mounting board 21, thermally conductive sheet 31 and the heat sink member 5 were in surface contact with each other.

Here, the thermal conductivities of the respective materials used were: 0.45 W/(m·K) for glass epoxy used for the mounting board 21, 5 W/(m·K) for the thermally conductive sheet 31, and 236 W/(m·K) for aluminum for the heat sink member 5.

Also magnesium or iron may be used for the heat sink member 5. The thermal conductivity of magnesium is 157 W/(m·K), and the thermal conductivity of iron is 83.5 W/(m·K). In the case of poor heat dissipation, the plate thickness may be increased or a heat dissipating fin may be provided.

Heat generated together with light emission from the LED light source 2 is transferred through the mounting board 21 and the thermally conductive sheet 31 to the heat sink member 5 to be dissipated. Also the heat is transferred from the lower end surface of the mounting board 21 to the heat sink member 5 to be dissipated.

Since the thermal conductivities of the mounting board 21 and the thermally conductive sheet 31 are extremely lower than that of the aluminum of the heat sink member 5, in order to improve heat conduction, reducing the thicknesses of the mounting board 21 and the thermally conductive sheet 31 possibly to minimum is effective.

A liquid crystal display panel 1 with a display area of 4.7 inches was used, in which sixteen LED light sources 2 were mounted and aligned on the mounting board 21. Under room temperature (25° C.), an electric current of 20 mA was applied to the LED light sources 2, and temperatures around the LED light sources 2 were measured.

As a result, it was revealed that temperatures around the LED light sources 2 were suppressed to 40° C., and the estimated life of the LED light sources could be prolonged up to about 7500 hours. In addition, although the degree was small, an improving tendency was observed in the luminous efficiency of the LED light sources.

On the other hand, when the thermally conductive sheet 31 was excluded, temperatures around the LED light sources reached 44° C., and the estimated life of the LED light sources was no longer than 6600 hours.

The results of the experiment verifies that by improving heat conduction by bringing the thermally conductive sheet 31 into tight attachment to the mounting board 21 and the heat sink member 5, and thereby efficiently transferring heat generated from the LED light sources to the heat sink member 5, the heat storage in the LED light sources 2 and the mounting board 21 can be reduced, and temperature rise at the LED light sources and regions around them can be minimized.

Example 2

The same temperature measurements as in Example 1 were carried out on a sample with a fluid 17 with low fluidity (thermally conductive compound) being applied between the mounting board 21 and the thermally conductive sheet 31 and between the thermally conductive sheet 31 and the heat sink member 5.

As the thermally conductive compound, SC102 produced by Dow Corning Toray Silicone Co., Ltd. was used, and the mounting board 21, the thermally conductive sheet 31 and the heat sink member 5 were fixed so that they were in surface contact with each other. The thermally conductive compound had a thermal conductivity of 0.8 W/(m·K).

The thermally conductive compound is in a clayish condition, which includes an oil component with high viscosity mixed with ceramic fine particles with high thermal conductivity, and the oil component conforms to minute irregularities formed on the surfaces of the heat sink member 5 and the mounting board 21, as well as good heat conduction is achieved through the ceramic particles with high thermal conductivity.

A liquid crystal display panel 1 with a display area of 4.7 inches was used, in which sixteen LED light sources 2 were mounted and aligned on the mounting board 21. Under room temperature (25° C.), an electric current of 20 mA was applied to the LED light sources 2, and temperatures around the LED light sources 2 were measured.

As a result, it was revealed that temperatures around the LED light sources 2 were suppressed to 39° C., and the estimated life of the LED light sources could be prolonged up to about 7700 hours. In addition, although the degree was small, an improving tendency was observed in the luminous efficiency of the LED light sources.

On the other hand, when the thermally conductive sheet 31 and the thermally conductive compound were excluded, temperatures around the LED light sources reached 44° C., and the estimated life of the LED light sources was no longer than 6600 hours.

The results of the experiment verifies that by interposing the thermally conductive compound between the thermally conductive sheet 31 and the mounting board 21 and between the thermal conductive sheet 31 and the heat sink member 5, the heat conduction from the LED light sources 2 to the heat sink member 5 can be further improved.

Example 3

The same temperature measurements as in Example 1 were carried out, in which a thermally conductive member 20 was added to the structure in Example 1.

The same material as the plate-like thermally conductive sheet with heat dissipation properties (Model No. 5509 of Sumitomo 3M Limited) was used for the thermally conductive member 20, and the mounting board 21 and the end surface on the light incident side of the light-guiding plate 3 were fixed so that they were brought into surface contact with each other.

Heat generated together with light emission from the LED light sources 2 is transferred through the mounting board 21 and the thermally conductive member 20 to be transferred also to the light-guiding plate 3. Accordingly, heat transferred from the mounting board 21 to the heat sink member 5 is dissipated mainly through three routes on the LED-mounting surface side, the back surface side and the lower end surface side of the mounting board 21.

A liquid crystal display panel 1 with a display area of 4.7 inches was used, in which sixteen LED light sources 2 were mounted and aligned on the mounting board 21. Under room temperature (25° C.), an electric current of 20 mA was applied to the LED light sources 2, and temperatures around the LED light sources 2 were measured.

As a result, it was revealed that temperatures around the LED light sources 2 were suppressed to 36° C., and the estimated life of the LED light sources could be prolonged up to about 8500 hours. In addition, although the degree was small, an improving tendency was observed in the luminous efficiency of the LED light sources.

On the other hand, when the thermally conductive member 20 and the thermally conductive sheet 31 were excluded, temperatures around the LED light sources reached 44° C., and the estimated life of the LED light sources was no longer than 6600 hours.

The results of the experiment verifies that by bringing the thermally conductive member 20 and the thermally conductive sheet 31 into tight attachment to the mounting board 21 and the heat sink member 5, the heat conduction was improved, and heat generated from the LED light sources can be efficiently transferred to the light-guiding plate 3 and the heat sink member 5.

Example 4

The same temperature measurements were carried out using the thermally conductive member 32 shown in FIG. 16(a) (Model No. 5509 of Sumitomo 3M Limited), in which the mounting board 21 and the thermally conductive member 32, and the thermally conductive member 32 and the heat sink member 5 were fixed so that they were brought into surface contact with each other, respectively.

A liquid crystal display panel 1 with a display area of 4.7 inches was used, in which eighteen LED light sources 2 were mounted and aligned on the mounting board 21. Under room temperature (25° C.), an electric current of 20 mA was applied to the LED light sources 2, and temperatures around the LED light sources 2 were measured.

As a result, it was revealed that temperatures around the LED light sources 2 were suppressed to 34° C., and the estimated life of the LED light source array could be prolonged up to about 9000 hours. In addition, although the degree was small, an improving tendency was observed in the luminous efficiency of the LED light source array.

On the other hand, when the thermally conductive member 32 was excluded, temperatures around the LED light sources reached 45° C., and the estimated life of the LED light source array was no longer than 6400 hours.

The results of the experiment verifies that by bringing the thermally conductive member 32 shown in FIG. 16(a) into tight attachment to the mounting board 21, the heat sink member 5 and the light-guiding plate 3, the heat conduction can be further improved.

In addition, because the thermally conductive member 32 is held within the heat sink member 5, the mounting board 21 can be maintained at the predetermined position with high stability, and moreover, even when impact is applied from the outside of the housing 6, the thermally conductive member 32 is capable of absorbing the impact. For this reason, a liquid crystal display device with high reliability in which the LED light sources 2 is not displaced or broken can be produced.

Example 5

The same temperature measurements as in Example 1 were carried out on a liquid crystal display device in which, as shown in FIG. 19, the LED light sources 2 were mounted on the mounting board 21 so that the LED-mounting surface of the mounting board 21 and the light-emitting surface of the LED light sources 2 were generally in parallel to each other, and one of the side surfaces of each of the LED containers 23b of the LED light sources 2 was mounted on the mounting board 21 as a LED-mounting surface.

A plate-like rubber sheet with heat dissipation properties (Model No. 5509 of Sumitomo 3M Limited) was used as the thermally conductive member 34, and it was fixed so as to be in surface contact with the LED light sources 2, the heat sink member 5 and the upper side housing 4.

A part of heat generated from the LED light source 2 together with light emission is transferred through the LED container 23b and the thermally conductive member 34 to be dissipated from the upper side housing 4 as well as dissipated from the side surface side of the heat sink member 5.

A liquid crystal display panel 1 with a display area of 4.7 inches was used, in which sixteen LED light sources 2 were mounted and aligned on the mounting board 21. Under room temperature (25° C.), an electric current of 20 mA was applied to the LED light sources 2, and temperatures around the LED light sources 2 within the backlight were measured. As a result, it was revealed that temperatures around the LED light sources 2 were suppressed to 36° C., and the estimated life of the LED light sources 2 could be prolonged up to about 8500 hours. In addition, although the degree was small, an improving tendency was observed in the luminous efficiency of the LED light sources 2.

On the other hand, when the thermally conductive member 34 was excluded, temperatures around the LED light sources reached 44° C., and the estimated life of the LED light sources 2 was no longer than 6600 hours.

The results of the experiment verifies that heat generated from LED light sources 2 can be efficiently transferred to the upper housing 4 and the heat sink member 5 through the thermally conductive member 34.

Example 6

As shown in FIG. 6, a 0.1 mm thick mounting board 21 whose both surfaces were provided with metal films 22, 26, a metal film pattern 25 and a driving metal wiring 24 was prepared. A 35 μm thick copper foil was used as the metal films. Through holes of 0.2 mm in diameter were provided as metal via holes 27, and inner peripheral walls of the through holes were plated with 25 μm thick copper.

A heat dissipating metal film 26 for the mounting board 21 was formed to a thickness of 35 μm to 60 μm that was larger than those of other films including the mounting metal film 22 and the metal film pattern 25 so as to facilitate heat conduction and dispersion. The surfaces of the metal films made of copper were coated with a solder film 28 with a thickness of about 20 μm. This improves not only the above described heat dissipating effect but also facilitates mounting of the LED light sources 2 and driving parts thereof on the mounting board 21 by soldering, and prevents the surfaces of the copper parts from oxidation, discoloring and corrosion.

Since the thermal conductivity of the mounting board 21 is extremely smaller than those of the metal materials used for the mounting metal film 22, the heat dissipating metal film 26, the metal film pattern 25 and the heat sink member 5, in order to improve the heat conduction of the heat sink member 5, reducing the thickness of the mounting board possibly to minimum is effective. A thin glass epoxy substrate was used for reliable insulation and cost reduction.

A 2 mm thick rectangular plate made of aluminum was used as the heat sink member 5, which was bent to have an L-shaped cross section so as to be in surface contact with the heat dissipating metal film 26 of the mounting board 21 and fixed to the mounting board 21 with screws. Here, thermal conductivities of the materials used were: 0.45 W/(m·K) for the mounting substrate (base body of the mounting board) made of glass fiber-based epoxy resin, 403 W/(m·K) for the copper, 236 W/(m·K) for the aluminum, 62.1 W/(m·K) for the solder, and 0.92 W/(m·K) for the heat dissipating bonding material.

Heat generated together with light emission at the LED chip 23a of the LED light source 2 is transferred through the heat dissipating bonding material 30 filled between the LED container 23b of the LED light source 2 and the mounting board 21.

As the heat dissipating bonding material 30, a thermally conductive adhesive agent (SE4420 produced by Dow Corning Toray Silicone Co., Ltd.) was used.

A 5.7 inch rectangular liquid crystal panel 1 was used as the liquid crystal display device, in which five LED light sources 2 were mounted linearly on the mounting board 21. An electric current of 250 mA was applied to each of the LED light sources 2, and then temperature rise at the LED-mounting surface of the mounting board 21 was measured.

As a result, temperature rise could be suppressed to 25° C. or below, and temperature rise at the back surface side could be suppressed to 18° C. or below. The decrease in luminance efficiency as compared to the luminance efficiency at room temperature of the LED light source including the LED light sources 2 was as small as about 2%, and a bright display was realized.

On the other hand, in a liquid crystal display device having an LED backlight, temperature rise at the mounting board, in particular, at regions around the LED light source was great: the temperature rose to 50° C. or more on the LED-mounting surface side of the mounting board, and the luminance efficiency of the LED light source decreased by 4% or more. In addition, when the environmental temperature under which the liquid crystal display device was used was raised from room temperature (25° C.) to 70° C., the temperature of the mounting board reached 120☐ or more, which was a condition under which damage to the LED light-emitting device could be anticipated.

The results of the experiment verifies that owing to the LED light source 2 mounting arrangement (interposing the heat dissipating bonding material 30), and various arrangements including the mounting metal film 22 of the mounting board 21, the heat dissipating metal film 26, the metal film pattern 25 and the metal via hole conductors 27, the heat conduction can be improved and heat generated from the LED light sources 2 can be efficiently transferred to the heat sink member 5.

Example 7

The same temperature measurements as in Example 6 were carried out using a silicone adhesive agent instead of the heat dissipating bonding material 30. In addition, the thermally conductive member 32 as in Example 4 was also used.

As the adhesive agent (bonding material), SE9176L produced by Dow Corning Toray Silicone Co., Ltd. was used.

While the thermal conductivity of air is 0.017 W/(m·K), the cited adhesive agent has a greater heat conduction effect as compared with air.

It is preferred that insulative fine particulate material or the like is mixed into the adhesive agent so as to further improve the thermal conductivity as long as it allows the adhesive agent to penetrate rapidly into gaps between the LED container 23b and the mounting board 21 and to eliminate air.

A liquid crystal display panel 1 with a display area of 4.7 inches was used, in which sixteen LED light sources 2 were mounted and aligned on the mounting board 21. Under room temperature (25° C.), an electric current of 20 mA was applied to the LED light sources 2, and temperatures around the LED light sources 2 within the backlight were measured.

As a result, it was revealed that temperatures around the LED light sources 2 were suppressed to 40° C., and the estimated life of the LED light sources 2 could be prolonged up to about 7500 hours. In addition, although the degree was small, an improving tendency was observed in the luminous efficiency of the LED light sources 2.

On the other hand, when the adhesive agent and the thermally conductive member 32 were excluded, temperatures around the LED light sources reached 44° C., and the estimated life of the LED light sources 2 was no longer than 6600 hours.

The results of the experiment verifies that by applying the adhesive agent 35 into gaps between the LED containers 23b of the LED light sources 2 and the mounting board 21 so that the thermally conductive member 32 is in tight attachment to the mounting board 21 and the heat sink member 5, the heat conduction can be improved, and thereby heat generated from LED light sources 2 can be efficiently transferred to the heat sink member 5.

The invention claimed is:

1. A light source device comprising:
a light source;
a mounting board on which the light source is mounted;
a light-guiding plate into which light from the light source is to enter;
a heat sink member disposed to have a space between the heat sink member and the mounting board; and
a thermally conductive member in the space; and
an adhesive agent or a fluid between the mounting board and the thermally conductive member and between the thermally conductive member and the heat sink member.

2. The light source device according to claim 1,
wherein the thermally conductive member is adhered to the heat sink member by an adhesive agent with high fluidity.

3. The light source device according to claim 1,
wherein the thermally conductive member is joined to terminal portions provided in the light sources.

4. The light source device according to claim 1,
wherein the thermally conductive member includes
a first thermally conductive member for covering a back surface disposed on the opposite side of a mounting surface of the mounting board on which the light sources are mounted, and
a second thermally conductive member for covering the mounting surface of the mounting board and surfaces of light sources such that at least light-emitting surfaces of the light sources are exposed.

5. A light source device comprising:
a light source;
a mounting board on which the light source is mounted;
a light-guiding plate into which light from the light source is to enter;
a heat sink member disposed to have a space between the heat sink member and the mounting board; and
a thermally conductive member in the space,
wherein the thermally conductive member includes
a first thermally conductive member for covering a back surface disposed on the opposite side of a mounting surface of the mounting board on which the light sources are mounted, and
a second thermally conductive member for covering the mounting surface of the mounting board and surfaces of light sources such that at least light-emitting surfaces of the light sources are exposed, wherein the second thermally conductive member is disposed so as to be in tight attachment to the end surface of the light-guiding plate and the mounting surface of the mounting board.

6. The light source device according to claim 5,
wherein the first thermally conductive member is integral with the second thermally conductive member.

7. The light source device according to claim 6,
wherein the thermally conductive member further includes a third thermally conductive member that covers at least one side surfaces of the mounting board and the third thermally conductive member, and the first thermally conductive member and the second thermally conductive member are integral with each other.

8. The light source device according to claim 1,
wherein the heat sink member is a metal case for holding the light sources and the thermally conductive member.

9. A light source device comprising:
a plurality of light sources;
a mounting board on which the light sources are mounted;
a light-guiding plate into which light from the light sources is to enter;
a heat sink member disposed to have a space between the heat sink member and the mounting board; and
a thermally conductive member in the space,
wherein the heat sink member is a metal case for holding the mounting board and the thermally conductive member,
wherein the thermally conductive member has opening portions corresponding to the light sources, and the light sources are connected to the light-guiding plate through the opening portions.

10. The light source device according to claim 9,
further comprising a light reflecting means that covers at least a part of the light-guiding plate and reflects light from the light sources that is incident inside the light-guiding plate.

11. The light source device according to claim 10,
wherein the reflecting means covers the thermally conductive member.

12. A light source device comprising:
a light source;
a mounting board on which the light source is mounted;
a light-guiding plate into which light from the light source is to enter;
a heat sink member disposed to have a space between the heat sink member and the mounting board; and
a thermally conductive member in the space,
wherein the thermally conductive member including
an extended portion that covers the mounting surface of the a mounting board,
a back surface disposed opposite to the mounting surface, and
a side surface connecting the mounting surface to the back surface, and
wherein the extended portion is connected to the heat sink member.

13. The light source device according to claim 1,
wherein a mounting metal film is formed on the mounting surface of the mounting board, and the light sources are attached to the mounting metal film through a heat dissipating bonding material with good heat dissipating properties and adhesiveness.

14. The light source device according to claim 1,
wherein a heat dissipating metal film is formed on a back surface located opposite to the mounting surface of the mounting board, and the heat dissipating metal film is connected to metal via holes penetrating between the mounting surface and the back surface.

15. The light source device according to claim 1,
wherein a mounting metal film joined to the light sources and a metal film pattern that is electrically connected to the mounting metal film are formed on the mounting surface of the mounting board.

16. The light source device according to claim 1,
wherein an adhesive agent with fluidity is filled into gaps formed between the light sources and the mounting board.

17. A liquid crystal display device comprising:
a light source device including
a light source,
a mounting board on which the light source are mounted,
a light-guiding plate into which light from the light source is to enter,
a heat sink member disposed to have a space between the heat sink member and the mounting board, and
a thermally conductive member in the space;
a liquid crystal display panel facing the light-guiding plate of the light source device; and
an adhesive agent or a fluid between the mounting board and the thermally conductive member and between the thermally conductive member and the heat sink member.

* * * * *